United States Patent

Kasatani et al.

[11] Patent Number: 4,529,565
[45] Date of Patent: Jul. 16, 1985

[54] POLYESTER OF SUBSTITUTED OR UNSUBSTITUTED PHENOXYHYDROQUINONE

[75] Inventors: Hideo Kasatani; Takashi Fujiwara, both of Nobeoka, Japan

[73] Assignee: Asahi Kasei Kogyo Kabushiki Kaisha, Osaka, Japan

[21] Appl. No.: 645,413

[22] Filed: Aug. 28, 1984

[30] Foreign Application Priority Data

Aug. 31, 1983 [JP] Japan ............... 58-159983
Dec. 16, 1983 [JP] Japan ............... 58-237560
Mar. 28, 1984 [JP] Japan ............... 59-60387

[51] Int. Cl.$^3$ ............... C08G 63/60
[52] U.S. Cl. ............... 264/176 R; 264/176 F; 264/236; 264/331.21; 528/176; 528/190; 528/191; 528/193; 528/194; 528/271
[58] Field of Search ............... 528/176, 190, 191, 193, 528/194, 271; 264/176 R, 176 F, 236, 331.21

[56] References Cited

U.S. PATENT DOCUMENTS

| | | | |
|---|---|---|---|
| 3,723,388 | 3/1973 | Bell | 260/47 C |
| 4,159,365 | 6/1979 | Payet | 428/364 |
| 4,238,600 | 12/1980 | Jackson, Jr. et al. | 528/190 |
| 4,242,496 | 12/1980 | Jackson, Jr. et al. | 528/176 |
| 4,355,133 | 10/1982 | East et al. | 528/193 |
| 4,360,658 | 11/1982 | Jackson, Jr. et al. | 528/193 |
| 4,412,058 | 10/1983 | Siemionko | 528/191 |
| 4,447,593 | 5/1984 | Funakoshi et al. | 528/176 |

FOREIGN PATENT DOCUMENTS 55-500215  4/1980  Japan .

OTHER PUBLICATIONS

Jackson, *The British Polymer Journal*, vol. 12, pp. 154–162, 1980.

Primary Examiner—Lester L. Lee
Attorney, Agent, or Firm—Berman, Aisenberg & Platt

[57] ABSTRACT

A polyester having a melt anisotropy, which consists essentially of structural units represented by the following formulae is described.

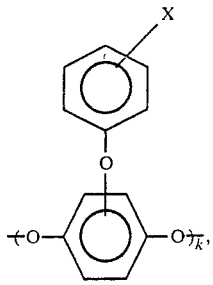

[I]

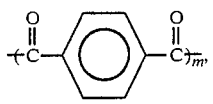

[II]

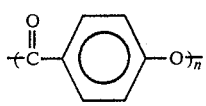

[III]

and

[IV]

wherein X is hydrogen, chlorine, methyl, ethyl, propyl, butyl, methoxy, ethoxy, nitro or cyano, Ar is selected from 1,4-phenylene, chloro-1,4-phenylene, methyl-1,4-phenylene, 4,4'-biphenylene, 3,5,3',5'-tetramethyl-4,4'-biphenylene, 1,4-naphthalene, 1,5-naphthalene, 2,6-naphthalene, dimethyl-1,4-phenylene, trimethyl-1,4-phenylene and oxy-4,4'-diphenylene, and k, l, m and n represent molar fractions of the corresponding units and they satisfy the following requirements:

$$0 \leq \frac{l}{k+l} \leq 0.5, \quad (1)$$

$$0 \leq \frac{n}{k+l+m+n} \leq 0.7, \quad (2)$$

and $$k+l \approx m \qquad (3)$$

The polyester is shaped into articles such as fiber and film. The shaped article is prepared by melt shaping the polyester to form a shaped article and then heating the shaped article at a temperature in the range of from a temperature lower by 50° C. than the softening point to the softening point.

16 Claims, 1 Drawing Figure

POLYESTER OF SUBSTITUTED OR UNSUBSTITUTED PHENOXYHYDROQUINONE

BACKGROUND OF THE INVENTION

(1.) Field of the Invention

The present invention relates to an aromatic polyester capable of forming an anisotropic melt. More particularly, it relates to an aromatic polyester composed wholly of aromatic constitutional units, which has a good melt-shapability and easily provides a shaped article such as fiber and film excellent in the physical properties.

(2.) Description of the Prior Art

Fibers having a relatively high tensile strength or high Young's modulus, for example, polyamide fibers such as polyhexamethylene adipamide fibers, polyester fibers such as polyethylene terephthalate fibers and inorganic fibers such as steel fibers or glass fibers, have been used as reinforcing fibers for organic polymeric materials such as rubbers and plastics according to uses of these organic polymeric materials. With recent progresses of technics in various industrial fields and increasing desires to attain energy-saving effects because of a fear of precarious supply of resources, it has been eagerly desired to improve the performances and reduce the weights in organic polymeric materials and also to develop high-performance organic polymeric materials that can be used as metal substitutes. In order to satisfy these requirements, it is necessary to develop reinforcing fibers excellent in the properties, especially the mechanical and thermal properties. However, conventional reinforcing fibers are insufficient in the mechanical properties, particularly the tensile strength and Young's modulus. Accordingly, various methods have heretofore been proposed for increasing the physical properties including these mechanical properties. However, no substantial improvements of the physical properties can be expected.

Aramide fibers such as poly-p-phenylene terephthalamide fibers and carbon fibers, which are known as high-performance fibers, have good performances and some of them are put into practical use. However, since the preparation process is complicated and these high-performance fibers are expensive, their application fields are limited and they are used only for special purposes.

It is known that fibers having a high Young's modulus can be obtained by ordinary melt spinning from a polyester capable of forming an anisotropic melt, which is called "liquid crystal polyester", and high-strength fibers can be obtained by heat-treating these fibers. It is expected that these fibers can be utilized as reinforcing fibers having good mechanical properties. Polyesters forming an anisotropic melt are characterized in that because of liquid crystal orientation characteristics in the molten state, the polyesters are highly oriented only by spinning without drawing and fibers having a high Young's modulus are obtained, and that if as-spun fibers are heat-treated at a high temperature close to the softening point in an inert gas atmosphere for a relatively long time, for example, for several hours to scores of hours, fibers having a tensile strength higher than 15 g/d can be obtained (see U.S. Pat. Nos. 3,991,013, 3,991,014, 4,118,372, 4,161,470, 4,238,559, 4,256,624 and 4,269,965).

It is considered that among polyesters forming an anisotropic melt, aromatic polyesters having a main chain composed solely of p-oriented benzene rings and ester bonds are especially preferred in the heat resistance and mechanical properties. However, shaping of these aromatic polyesters is generally difficult because they have a high melting point. For example, although a shapable wholly aromatic polyester formed from phenylhydroquinone and terephthalic acid has been proposed (U.S. Pat. No. 4,159,365), this polyester has a high melting point and the shapability is not sufficiently satisfactory.

Ordinarily, in order to obtain fibers having a high tensile strength, it is necessary to heat-treat spun fibers for a long time, and hence, actual industrial working is difficult.

SUMMARY OF THE INVENTION

It is a primary object of the present invention to provide an aromatic polyester which does not have the foregoing defects of conventional polyesters forming an anisotropic melt and which is excellent in the melt shapability and capable of being easily shaped into a shaped article having high physical properties.

More specifically, in accordance with the present invention, there is provided a polyester having a melt anisotropy, which consists essentially of structural units represented by the following general formulae:

[I]

[II]

[III]

and

[IV]

wherein X stands for a hydrogen atom, a chlorine atom, a methyl group, an ethyl group, a propyl group, a butyl group, a methoxy group, an ethoxy group, a nitro group or a cyano group, Ar stands for a divalent group selected from 1,4-phenylene, chloro-1,4-phenylene, methyl-1, 4-phenylene, 4,4'-biphenylene, 3,5,3',5'-tetramethyl-4,4'-biphenylene, 1,4-naphthalene, 1,5-naphthalene, 2,6-naphthalene, dimethyl-1,4-phenylene, trimethyl-1,4-phenylene and oxy-4,4'-diphenylene groups, and k, l, m and n represent molar fractions of the corresponding units and they satisfy the following requirements:

$$0 \leq \frac{l}{k+l} \leq 0.5, \tag{1}$$

-continued $$0 \leq \frac{n}{k+l+m+n} \leq 0.7, \quad (2)$$

and $$k+l \approx m \quad (3),$$

DESCRIPTION OF THE PREFERRED EMBODIMENTS

In the wholly aromatic polyester of the present invention, the presence of the substituted or unsubstituted phenoxyhydroquinone units represented by the general formula [I] and the terephthalic acid units represented by the general formula [III] is indispensable. If desired, the aromatic dihydroxyl compound units represented by the general formula [II] may be substituted for up to ½ of the molar fraction of the units of the general formula [I] and the p-hydroxybenzoic acid units represented by the general formula [IV] may be substituted for up to 70 mole % of the total structural units.

The units represented by the general formula [I] constituting the polyester of the present invention can be derived from a substituted or unsubstituted phenoxyhydroquinone or a lower fatty acid ester thereof such as a diacetate. Phenoxyhydroquinone can be obtained by hydrolyzing phenoxyhydroquinone dimethyl ether formed by reaction of bromohydroquinone dimethyl ether with sodium phenoxide (see the Journal of Organic Chemistry, 20, page 1326). Substituted phenoxyhydroquinones such as t-butylphenoxyhydroquinone, methylphenoxyhydroquinone, ethylphenoxyhydroquinone, propylphenoxyhydroquinone, chlorophenoxyhydroquinone and nitrophenoxyhydroquinone may similarly be prepared. Of course, these substituted and unsubstituted phenoxyhydroquinones can be prepared according to other methods.

As the substituent X in the substituted phenoxyhydroquinone units of the general formula [I] constituting the wholly aromatic polyester of the present invention, there can be mentioned a chlorine atom, a methyl group, an ethyl group, an n-propyl group, an isopropyl group, an n-butyl group, an isobutyl group, a t-butyl group, a methoxy group, an ethoxy group, a nitro group and a cyano group. The position of the substituent X is not particularly critical, and X may be a p-substituent, an m-substituent or an o-substituent. The units of the general formula [I] may have two or more of substituents which may be the same or different.

Unsubstituted phenoxyhydroquinone units are most preferred as the units of the general formula [I] constituting the wholly aromatic polyester of the present invention.

The units represented by the general formula [II] can be derived from hydroquinone, chlorohydroquinone, methylhydroquinone, 4,4'-biphenol, 3,5,3',5'-tetramethyl-4,4'-biphenol, 1,4-dihydroxynaphthalene, 1,5-hydroxynaphthalene, 2,6-dihydroxynaphthalene, 2,3-dimethylhydroquinone, 2,5-dimethylhydroquinone, 2,6-dimethylhydroquinone, 1,2,5-trimethylhydroquinone or 4,4'-dihydroxydiphenyl ether, or a lower fatty acid ester thereof such as a diacetate.

The units represented by the general formula [III] can be derived from terephthalic acid, dimethyl terephthalate or diphenyl terephthalate.

The units represented by the general formula [IV] can be derived from p-hydroxybenzoic acid or p-acetoxybenzoic acid, or an ester thereof such as phenyl p-hydroxybenzoate.

The units of the general formula [I] in the polyester of the present invention has effects of preventing the polyester from becoming excessively crystalline and of reducing the melting point of the polyester. Accordingly, when the units of the general formula [I] are substituted by the units of the general formula [II], if the molar fraction of the units of the general formula [II] is large and exceeds 50 mole % of the total diol component, the melting point of the polyester is increased and melt shaping becomes difficult. Accordingly, it is preferred that the proportion of the units of the general formula [I] to the total diol component be at least 80 mole %, more preferably at least 90 mole %.

The units represented by the general formula [IV] have an effect of giving an appropriate flowability to the polyester, but when the units of the general formula [IV] are incorporated, it is required that the content of the units of the general formula [IV] should be up to 70 mole % of the total structural units. If this content exceeds 70 mole %, the characteristics of a homopolymer of p-hydroxybenzoic acid are strongly manifested, and the melting point is elevated and the shapability is degraded. It is preferred that the content of the units of the general formula IV be 5 to 40 mole %, more preferably 15 to 25 mole %, of the total structural units.

It is preferred that the amount of the structural units of the general formula [III] constituting the carboxylic acid component of the polyester should be approximately equal to the amount of the diol component, that is, the total molar amount of the units of the general formulae [I] and [II]. If the amount of the units of the general formula [III] is thus selected, the degree of polymerization can be maintained at a desirable level and reduction of the shapability and other physical properties due to incorporation of the unreacted component can be controlled. More specifically, it is preferred that the requirement of $0.95 \leq k+l/m \leq 1.05$ be satisfied.

As described hereinbefore, the wholly aromatic polyester of the present invention consists essentially of the units represented by the general formulae [I], [II], [III] and [IV], but the polyester may contain other structural units, so long as the desired physical properties are not degraded. As such optional units, there can be mentioned phenoxyresorcinol units, resorcinol units, methylresorcinol units, chlororesorcinol units, isophthalic acid units, m-hydroxybenzoic acid units, bisphenol A units and 1,2-ethylene-bis(p-carboxyphenoxy) units. These optional units may be incorporated in amounts of up to 5 mole %, preferably up to 3 mole %, based on the total structural units.

The polyester of the present invention is characterized in that it has a melt anisotropy. The melt anisotropy referred to herein means such a property that in the molten state, the polyester allows permeation of light in an optical system provided with a pair of polarizers intersecting each other at 90°. This melt anisotropy is important for ensuring a high orientation in the as-shaped state.

The inherent viscosity of the polyester as measured at 35° C. according to the customary method hereinafter mentioned can be varied in the range of from about 0.2 to about 20 by changing the polymerization conditions, but in view of the shapability and the mechanical property of the shaped article, it is preferred that the inherent viscosity of the polyester before shaping be in the range of from 1.0 to 10.0, more preferably from 1.0 to 5.0.

When the polyester of the present invention is subjected to so-called solid phase polymerization by the heat treatment, it sometimes happens that the inherent viscosity is drastically increased and becomes insoluble in the mixed solvent for measurement of the inherent viscosity. Also this polyester is included in the scope of the present invention.

The polyester of the present invention can be prepared, for example, according to (1) a method in which substituted or unsubstituted phenoxyhydroquinone diacetate or this compound and a diacetate of a specific aromatic dihydroxyl compound are mixed with terephthalic acid and p-acetoxybenzoic acid and deacetylating polycondensation is carried out under heating with stirring and (2) a method in which substituted or unsubstituted phenoxyhydroquinone or this compound and a specific aromatic dihydroxyl compound are mixed with diphenyl terephthalate and phenyl p-hydroxybenzoate, and dephenylating polycondensation is carried out under heating with stirring.

The method (1) will now be described more specifically. A polymerization reaction vessel equipped with a stirrer, a nitrogen gas-introducing tube and a reduced pressure distilling device is charged with substituted or unsubstituted phenoxyhydroquinone diacetate, a diacetate of a specific aromatic dihydroxyl compound, terephthalic acid and p-acetoxybenzoic acid, and the mixture is heated with stirring at a temperature of 200° to 350° C. for 5 minutes to 4 hours in a nitrogen gas current to effect reaction. Then, the pressure is gradually reduced and polycondensation reaction is carried out at a temperature of 280° to 350° C. under a reduced pressure of 0.1 to 2.0 Torr for 1 minute to 4 hours to obtain a polyester. At an optional stage of this reaction, a polycondensation catalyst such as an antimony or germanium compound, a stabilizer such as a phosphorus compound and a delustering agent such as titanium oxide may be added.

The thus-obtained polyester melt may be melt-shaped into a fiber, a film or other shaped article, or the polyester melt may be cooled and solidified, formed into a chip or powder, melted again and then shaped. Moreover, the degree of polymerization may be increased by subjecting the solidified polymer at a temperature lower than the melting point under vacuum or in an inert atmosphere. It is preferred that the polyester constituting the shaped article have an inherent viscosity of at least 1.0 in view of the mechanical properties, and further that said polyester have an inherent viscosity in the range of from 1.0 to 5.0 before the heat treatment in view of the shapability and of greater than 7.0 after the heat treatment in view of the mechanical properties.

It is preferred that the melting point of the polyester of the present invention before shaping be in the range of from about 250° to about 380° C., more preferably from 280° to 350° C. The melting point referred to herein may be observed as the endothermic peak in the thermal analysis such as DSC or DTA, but since the melting point agrees substantially with the softening point determined according to the measurement method described hereinafter, the melting point may be presumed according to this method.

The polyester of the present invention may easily be shaped into a fiber, a film, a tape or other molded articles according to a known method. For example, a customary melt-spinning method may be adopted for the production of a fiber. More specifically, the polyester is extruded from a spinneret having one or more of orifices at a temperature higher than the softening point but not higher than 400° C. by using an extruder. The orifice diameter is ordinarily 0.08 to 1.0 mm. The extruded polyester melt is rapidly cooled below the spinneret or the extrudate is passed through a high-temperature atmosphere in a heating cylinder or heat insulating cylinder disposed below spinneret and then cooled to be solidified. The formed fiber is then wound. It is preferred that the draft ratio be 1.2 to 1000 and the winding speed be 30 to 5000 m/min. The thus-obtained polyester fiber has ordinarily an X-ray orientation angle of not larger than 25° as determined according to the measurement method described below. The X-ray orientation angle may be varied depending upon the winding speed and draft ratio, and it is preferred that the X-ray orientation angle be not larger than 20°. The polyester fiber has a high modulus and it can be used as it is. Moreover, the strength can be increased by subjecting the thus-obtained polyester fiber to a heat treatment.

This heat treatment is carried out under no tension or a slight tension, and it is not preferred that the heat treatment be conducted under such a high tension as will cause structure fracture in the fiber but no substantial influences are given by a lower tension. A fusion-preventing agent such as talc or graphite may be applied at the heat treatment. Furthermore, in order to prevent decomposition of the polyester by oxygen and remove a volatile product formed by the polymerization, the heat treatment is carried out under vacuum of not more than 10 torr or while discontinuously or continuously supplying an inert gas such as nitrogen or argon. The heat treatment is carried out at a temperature in the range of from a temperature lower by several tens degree C. (usually about 50° C.) than the softening point of the fiber to the softening point thereof.

The speed of solid state polymerization by the heat treatment which is observed by the enhancement of the inherent viscosity becomes faster as the heat treatment temperature becomes higher. However, if the heat treatment temperature in the heat treatment is too high, the partial fusion of fiber occurs with the result that the enhancement of the mechanical properties is prevented. Therefore, the heat treatment temperature should appropriately be selected in this view point within the above-mentioned range. Since the softening point is ordinarily elevated with advance of the heat treatment, the heat treatment temperature may be elevated stepwise. The heat treatment for conventional polyesters forming an anisotropic melt is ordinarily conducted for several minutes to about 24 hours. In contrast, in the polyester of the present invention, since the speed of increase of the degree of polymerization or the strength of the fiber is very high, the heat treatment time is selected within the range of from several minutes to about 2 hours. The thus-obtained fiber ordinarily has an X-ray orientation almost equal to the X-ray orientation before the heat treatment.

The heat treatment of the polyester fiber can be performed according to (1) a method in which the fiber is heated in the state where it is wound in the form of a bobbin, (2) a method in which the fiber is heated in the state where it is bundled in the form of a hank, (3) a method in which the fiber is heated while it is travelled through at least one pair of rolls and (4) a method in which the fiber is heated in the state where it is placed on a moving net conveyor. Of course, the heat treatment methods that can be adopted are not limited to these methods. Furthermore, there may be adopted a method in which a shaped article is prepared by using the polyester fiber as a reinforcer and the shaped article is then subjected to the heat treatment. It is preferred that the inherent viscosity of the polyester fiber be in the range of 1.0 to 3.0 before the heat treatment and greater than 7.0 after the heat treatment.

Customary melt film-forming techniques can be adopted for the production of films. For example, there may be adopted a method in which the polyester melt is extruded from a T-die, cooled and solidified and then wound, and a method in which the polyester melt is extruded from a ring die, expanded and then wound. The obtained film may be heat-treated in the same manner as described above with respect to the fiber. It is preferred that the inherent viscosity of the polyester film be in the range of 2.0 to 5.0 before the heat treatment and greater than 7.0 after the heat treatment.

Injection molding or compression molding may be adopted for the production of molded resin articles. The resulting molded resin article may be subjected to the heat treatment according to need.

The polyester of the present invention has an especially low melting point suitable for melt shaping, though the polyester of the present invention is an aromatic polyester composed solely of p-oriented benzene rings, aromatic rings and ester bonds. The polyester of the present invention has a very good flowability and hence the melt shaping operation can be performed very smoothly. The rate of elevation of the strength of the fiber melt-spun from the polyester of the present invention by the heat treatment is so high that the strength is increased to a level higher than 20 g/d by the heat treatment conducted for a very short time, for example, within 1 hour. Therefore, the problem of the long-time heat treatment, which has rendered industrial working of the production of high-strength fibers of this type difficult, can be solved very easily according to the present invention.

From such improvements of the physical properties by the heat treatment, it can be expected that when the polyester of the present invention is shaped into a film, a sheet or other shaped article, the toughness, tensile strength, impact strength, tear strength and heat resistance will be improved.

The rate of increase in the strength of the shaped article of the polyester of the present invention by the heat treatment is much higher than that of a shaped article of a conventional polyester having an approximately similar molecular structure (proposed in U.S. Pat. No. 4,159,365). The reason is not clear, but it is believed that the polyester of the present invention is peculiar in the influences of the phenoxy group on the thermal motion property and the reactivity with the terminal of the ester bond-forming molecule.

Another characteristic feature of the polyester of the present invention is that the polyester undergoes almost no oxidative deterioration even at a high temperature. Although no improvement of the tensile strength or elongation can be expected in a shaped article of a known polyester by the heat treatment conducted in an oxygen-containing atmosphere, this improvement can be attained in a shaped article of the polyester of the present invention.

Still another characteristic feature of the polyester of the present invention is that a shaped article of the polyester of the present invention has excellent mechanical properties and heat resistance. For example, the fiber has a high tensile strength, a relatively large elongation, a high toughness and a very high knot strength, and furthermore, the fiber is excellent in the physical properties at high temperatures, for example, the tensile strength and modulus at a temperature of 150° C. Moreover, the film has a high tensile strength and is excellent in the tensile modulus, tensile strength and dimensional stability at high temperatures. The molded resin article are excellent in the tensile strength, tensile modulus, flexural strength and flexural modulus and these excellent properties and high dimension stability can be maintained even at high temperatures. Moreover, in case of the molded resin article, a high dimension precision can be attained at the injection molding step. This characteristic feature is sufficiently exerted when the softening point or the degree of polymerization is increased by the heat treatment of the molded article.

Since the polyester of the present invention has various excellent characteristics as described above, the polyester of the present invention can be advantageously used mainly for industrial materials, for example, as reinforcing fibers for tire cords and fiber-reinforced resins, films for flexible printed circuit boards, electrically insulating films and molded articles for electric parts.

The present invention will now be described in detail with reference to the following examples that by no means limit the scope of the invention.

The properties described in the examples are determined according to the following methods.

Inherent Viscosity ($\eta$inh)

A polyester is dissolved in a mixed solvent composed of p-chlorophenol, phenol and tetrachloroethane at a weight ratio of 40/25/35 at a concentration of 0.5 g/dl, and the falling time (seconds) is measured by using an Ostwald viscometer. The value $\eta$inh is calculated from the measured value.

Softening Point

A slice sample is inserted between cover glass sheets and the sample is heated at a temperature-elevating rate of about 30° C./min while observing the sample by a polarization microscope. The temperature (softening point) at which flowing begins is measured.

X-Ray Orientation Angle

A fiber is cut into an appropriate length and an X-ray diffraction intensity curve is determined. At the Bragg angle $2\theta$ of 19.7° at which the maximum intensity is observed, the sample fiber is rotated. The half value width of the obtained diffraction intensity curve is determined and designated as the X-ray orientation angle.

Melt Viscocisity ($\eta$melt)

A polymer is melt-extruded at a predetermined temperature by using a Koka-type flow tester. The melt viscosity $\eta$melt is calculated from the extrusion quantity Q (cc/sec) according to the following equation:

$$\eta\text{melt} = \pi P r^4 / 8 l Q$$

wherein l stands for the length (cm) of the spinning orifice, P stands for the pressure loss (dyne/cm²) in the spinning orifice and r stands for the radius of the spinning orifice (cm).

Ordinarily adopted conditions are l of 0.05 cm, r of 0.0125 cm and P of $9.8 \times 10^6$ dyne/cm².

Tensile properties

The tensile properties of the fibers were measured on single filaments by using a TOYO-BALDWIN TENSILON tensile tester at a gauge length of 2 cm and an elongation rate of 100% per minute, and calculated from the stress-strain curve. The tensile properties of the films were measured in the same manner as mentioned above except that the sample used had a width of 1 cm.

EXAMPLE 1

Polymerization

A polymerization reaction vessel equipped with a stirrer and a reduced pressure distilling device was charged with 66.0 g (0.23 mole) of phenoxyhydroquinone diacetate, 34.7 g (0.22 mole) of terephthalic acid and 16.5 g (0.09 mole) of p-acetoxybenzoic acid. The temperature was elevated to 320° C. with stirring in a nitrogen current over a period of 80 minutes and reaction was carried out at 320° C. for 20 minutes. The pressure was gradually reduced over a period of 5 minutes and reaction was further conducted under 0.2 Torr for 20 minutes. After completion of the reaction, nitrogen was introduced to restore the normal pressure, and the polyester melt was taken out and then rapidly cooled to be thereby solidified. The solid was pulverized by a crusher to form a chip.

The elementary analysis values of the thus-obtained polyester are as follows.

Found values: C=72.1%, H=3.5%. Calculated values: C=72.0%, H=3.5%.

Figure 1:
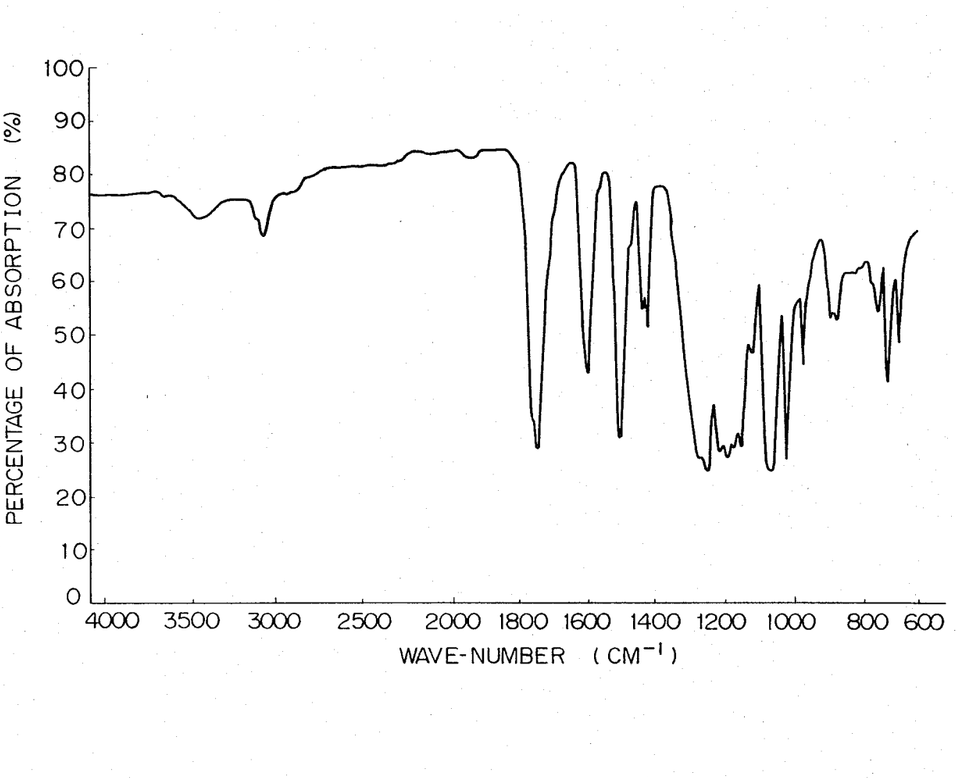
FIG. 1 is an infrared absorption spectrum curve of the polyester obtained in Example 1, which is determined according to the potassium bromide tablet method.

The infrared absorption spectrum of the polyester as determined according to the potassium bromide tablet method is shown in the accompanying drawing. In this absorption spectrum, a peak of the stretching vibration of C=O attributed to the aromatic ester bond is observed at 1750 cm$^{-1}$ and peaks of the stretching vibration of C-O-C are observed at 1260 cm$^{-1}$ and 1070 cm$^{-1}$, while peaks attributed to the monomers disappear. Thus, formation of the polyester can be confirmed.

In the differential thermal analysis (DTA) chart of this polyester, a small endothermic peak is observed at 295° C., and the decomposition temperature determined according to the thermogravimetric analysis (TG) was 415° C. The softening point was 310° C. and the polyester showed an anisotropy in the molten state. The inherent viscosity was 2.18, the melt viscosity at 320° C. was 47 poise, and the polyester had a flowability suitable for melt shaping.

Formation of Fiber

The obtained chip was dried at 180° C. for 8 hours under reduced pressure and melt-extruded at a spinning orifice temperature of 330° C. by using a melt-spinning apparatus provided with an extruder having a screw diameter of 25 mm and a spinneret having six spinning orifices having a diameter of 0.25 mm. The extrudate was wound at a speed of 270 m/min. The obtained polyester fiber was characterized by an X-ray orientation angle of 15.7°, a single filament denier of 14.3, a tensile strength of 3.2 g/d, an elongation of 1.2% and an initial modulus of 311 g/d. When this fiber was heat-treated in a manner described below, the strength was remarkably increased.

Heat Treatment

The fiber was placed in a cylindrical flask having an inner volume of 10 l. The temperature of the fiber was elevated to 310° C. over a period of 25 minutes while supplying nitrogen at a rate of 2 l/min. The heat treatment was conducted at 310° C. for 20 minutes. The obtained heat-treated fiber was characterized by an X-ray orientation angle of 16.0°, a tensile strength of 21.2 g/d, an elongation of 5.8% and an initial modulus of 329 g/d. The heat-treated fiber was insoluble in the mixed solvent used for measurement of the inherent viscosity. When the heat treatment was repeated twice in the same manner except that the heat treatment time was shortened to 5 minutes and 10 minutes, the inherent viscosities of the heat-treated fibers are 5.1 and 8.9, respectively. These results show that the inherent viscosity of the above-mentioned fiber which were heat-treated at 310° C. for 20 minutes was greater than these values. It was confirmed that the tensile strength and elongation were remarkably improved by the heat treatment conducted for a short time.

Formation of Film

The above polyester was dried at 180° C. for 8 hours and was then extruded at 300° C. by using an apparatus provided with an extruder having a screw diameter of 25 mm and a hollow yarn-preparing lip having an inner diameter of 3.5 mm and an outer diameter of 4.0 mm. The extruded hollow melt was continuously inflated by applying a pressure of about 2.5 kg/cm² to the hollow portion. Then, the inflated extrudate was air-cooled and wound at a rate of 3 m/min. A transparent portion having a diameter of about 30 mm was taken out to obtain a film having a thickness of about 12 μm, which was characterized by a tensile strength of about 19 kg/mm² and an initial modulus of about 770 kg/mm².

The film was secured to a stainless steel frame and placed in the same flask as used for the heat treatment of the fiber. The temperature was elevated to 210° C. over a period of 15 minutes in a nitrogen current. The film was maintained at 210° C. for 10 minutes and the temperature was elevated to 290° C., and the heat treatment was conducted at 290° C. for 30 minutes, whereby the tensile strength was increased to about 38 kg/mm².

Examples 2 through 5

Polyesters differing in the monomer composition were prepared from phenoxyhydroquinone diacetate, terephthalic acid and p-acetoxybenzoic acid in the same manner as described in Example 1. The softening points, inherent viscosities and elementary analysis values of these polyesters are shown in Table 1.

Each of these polyesters had a melt anisotropy, and when the polyester was taken out from the polymerization vessel, it showed fiber-forming properties. Each polyester had a flowability suitable for the shaping operation such as the spinning or film-forming operation at a temperature higher by at least 5° C. than the softening point. Moreover, each polyester could be formed into a tough film by a hot press machine.

TABLE 1

| Example No. | Amounts charged (moles) | | | Polymerization conditions (temp/time) | | Softening point (°C.) | Inherent viscosity | Elementary analysis value (%) | | | |
| --- | --- | --- | --- | --- | --- | --- | --- | --- | --- | --- | --- |
| | Plenoxy-hydroquinone diacetate | Terephthalic acid | p-Acetoxy-benzoic acid | Normal pressure | Vaccum | | | Found values C | H | Calculated values C | H |
| 2 | 0.056 | 0.052 | — | (1) 30–300° C./30 min. (2) 300° C./10 min. | 300° C./2 min. | 350 | 0.55 | 72.3 | 3.5 | 72.3 | 3.6 |
| 3 | 0.030 | 0.030 | 0.010 | (1) 30–320° C./60 min. (2) 320° C./10 min. | 320° C./10 min. | 340 | 6.9 | 72.1 | 3.6 | 72.0 | 3.6 |
| 4 | 0.030 | 0.030 | 0.020 | (1) 30–320° C./60 min. (2) 320° C./30 min. | 320° C./30 min. | 320 | 11.2 | 71.6 | 3.5 | 71.8 | 3.6 |
| 5 | 0.030 | 0.030 | 0.030 | (1) 30–320° C./60 min. (2) 320° C./30 min. | 320° C./30 min. | 350 | Insoluble | 71.9 | 3.5 | 71.7 | 3.5 |

EXAMPLE 6

Polymerization

A polymerization reaction vessel equipped with a stirrer and a reduced pressure distilling device was charged with 200.2 g (0.7 mole) of phenoxyhydroquinone diacetate, 81.0 g (0.3 mole) of 4,4'-biphenol diacetate and 166.0 g (1.0 mole) of terephthalic acid. The temperature was elevated to 335° C. for 80 minutes with stirring in a nitrogen current and reaction was carried out at 335° C. for 60 minutes. Then, the pressure was gradually reduced over a period of 4 minutes and reaction was conducted under 0.2 Torr for 120 minutes. After completion of the reaction, nitrogen was introduced to restore the normal pressure, and the polyester melt was taken out, rapidly cooled and solidified, and then pulverized by a crusher to form a chip.

The elementary analysis values of the thus-obtained polyester are as follows.

Found value: C=73.2%, H=3.7%. Calculated value: C=73.3%, H=3.7%.

It was confirmed that the polyester consisted essentially of the following structural units:

The decomposition temperature of this polyester, determined by the thermogravimetric analysis (TG), was about 420° C. The softening point was 320° C. The polyester showed an optical anisotropy in the molten state. The inherent viscosity was 2.8 and the melt viscosity at 340° C. was 52 poise. The polyester had a flowability suitable for the spinning and film-forming operations.

Spinning

The obtained chip was dried at 180° C. under reduced pressure for 8 hours. The dried chip was extruded at a spinning orifice temperature of 340° C. by using a melt spinning apparatus comprised of an extruder having a screw diameter of 25 mm and a spinneret having 28 orifices each having a diameter of 0.1 mm. The extrudate was wound at 137 m/min or 250 m/min. The polyester fiber (A) wound at a rate of 137 m/min was characterized by an X-ray orientation angle of 16.5°, a single filament denier of 9.3, a tensile strength of 4.7 g/d, an elongation of 1.7% and an initial modulus of 298 g/d. The polyester fiber (B) wound at a rate of 250 m/min was characterized by an X-ray orientation angle of 15.8°, a single filament denier of 5.4, a tensile strength of 5.4 g/d, an elongation of 1.7% and an initial modulus of 341 g/d.

Heat Treatment

The fiber (A) was placed in a cylindrical flask having an inner volume of 10 l. The temperature was elevated to 305° C. over a period of 25 minutes while supplying nitrogen at a rate of 2 l/min. The heat treatment was further conducted at 305° C. for 40 minutes. The obtained heat-treated fiber was characterized by an X-ray orientation angle of 16.3°, a tensile strength of 20.1 g/d, an elongation of 4.9% and an initial modulus of 305 g/d. The tensile strength and elongation were remarkably increased by conducting the heat treatment for a short time.

The fiber (B) was heat-treated in the same manner as described above except that the temperature pattern was changed as described below. Namely, the temperature was elevated to 260° C. from room temperature over a period of 20 minutes, the temperature of 260° C. was maintained for 5 minutes, the temperature was elevated to 315° C. over a period of about 7 minutes, and the heat treatment was conducted at this temperature for 23 minutes. The obtained heat-treated fiber had an X-ray orientation angle of 15.7°, a tensile strength of 19.5 g/d, an elongation of 5.1% and an initial modulus of 312 g/d. Also in the fiber (B), the tensile strength and elongation were remarkably increased by conducting the heat treatment for a short time. The heat-treated fibers (A) and (B) were insoluble in the mixed solvent used for measurement of the inherent viscosity.

EXAMPLES 7 THROUGH 15

Polyesters differing in the kinds of the monomers and the monomer composition were prepared in the same manner as described in Example 6. The softening points, inherent viscosities and elementary analysis values of these polyesters are shown in Table 2.

Each of the polyesters had a melt anisotropy, and when the polyester was taken out from the polymerization vessel, it showed a fiber-forming property.

mixed together with stirring in a 10-liter separable flask, and sodium p-t-butylphenolate was formed with generation of heat. Methanol and water were removed by distillation, and the residue was dried in vacuum at 120° C. to isolate sodium p-t-butylphenolate in the form of a

TABLE 2

| | Amounts charged (moles) | | | | | | Elementary analysis value (%) | | | |
|---|---|---|---|---|---|---|---|---|---|---|
| | Plenoxy- | | | | | | Found values | | Calculated values | |
| Example No. | hydro-quinone diacetate | Tere-phthalic acid | p-Acetoxy-benzoic acid | Diacetate of aromatic dihydroxyl compound | Softening point (°C.) | Inherent viscosity | C | H | C | H |
| 7 | 0.10 | 0.15 | 0.15 | Trimethylhydroquinone diacetate 0.05 | 220 | 1.0 | 71.3 | 4.1 | 71.6 | 4.0 |
| 8 | 0.15 | 0.20 | 0 | 3,5,3',5'-Tetra-methyl-4,4-biphenol diacetate 0.05 | 340 | 1.9 | 74.1 | 4.2 | 73.7 | 4.1 |
| 9 | 0.20 | 0.30 | 0.10 | 2,6-Dimethylhydro quinone diacetate 0.10 | 300 | Not measured | 71.8 | 3.8 | 71.9 | 3.8 |
| 10 | 0.10 | 0.20 | 0.10 | 1,4-Naphthalenediol diacetate 0.10 | 350 | Insoluble | 72.8 | 3.6 | 72.8 | 3.5 |
| 11 | 0.10 | 0.15 | 0.10 | 1,5-Napthalenediol diacetate 0.05 | 290 | 1.2 | 72.5 | 3.4 | 72.4 | 3.5 |
| 12 | 0.25 | 0.35 | 0 | 4,4'-Dihydroxydi-phenyl ether diacetate 0.10 | 330 | 0.8 | 72.3 | 3.6 | 72.3 | 3.6 |
| 13 | 0.14 | 0.20 | 0.05 | 2,6-Naphthalenediol diacetate 0.06 | 310 | 2.1 | 72.5 | 3.5 | 72.6 | 3.5 |
| 14 | 0.30 | 0.45 | 0.45 | 4,4'-Biphenol acetate 0.15 | 270 | 3.9 | 72.4 | 3.5 | 72.5 | 3.6 |
| 15 | 0.032 | 0.043 | 0.013 | Methylhydroquinone 0.011 | 280 | 1.8 | 71.8 | 3.9 | 71.8 | 3.7 |

EXAMPLE 16

The polyester of Example 14 was dried at 180° C. for 8 hours and then extruded at 300° C. by using a melt shaping apparatus comprised of an extruder having a screw diameter of 25 mm and a hollow yarn-forming lip having an inner diameter of 3.5 mm and an outer diameter of 4.0 mm. The extruded hollow melt was continuously inflated by applying a pressure of about 2.5 kg/cm$^2$ to the hollow portion, and the extrudate was air-cooled and wound at a rate of 3 m/min. A transparent portion having a diameter of about 30 mm was cut out to obtain a film having a thickness of about 11 μm, which was characterized by a tensile strength of about 17 kg/mm$^2$ and an initial modulus of about 800 kg/mm$^2$.

This film was secured to a stainless steel frame and placed in the same heat treatment flask as used in Example 1. In a nitrogen current, the temperature was elevated to 210° C. over a period of 15 minutes, the temperature of 210° C. was maintained for 10 minutes, the temperature was then elevated to 260° C., and the heat treatment was conducted at 260° C. for 50 minutes, whereby the tensile strength was increased to about 35 kg/mm$^2$.

EXAMPLE 17

Preparation of 2-(4-t-butylphenoxy)hydroquinone diacetate

In 2500 cc of methanol was dissolved 2000 g of p-t-butylphenol. Separately, 520 g of sodium hydroxide was added to a mixed solvent comprising 2100 cc of methanol and 400 cc of water. Both the liquids were yellow powder having a melting point higher than 400° C.

Then, 217 g of the thus-obtained sodium p-t-butylphenolate and 207 g of 2-bromo-1,4-dimethoxybenzene were charged in a 1-liter separable flask, and 1.6 g of copper was added. Reaction was carried out at 230° C. for 4 hours. A black liquid reaction mixture containing the unreacted compounds was obtained. The liquid reaction mixture was extracted with benzene and reduced pressure distillation was performed at 120° to 130° C. to recover 2-(4-t-butylphenoxy)-1,4-dimethoxybenzene. This operation was repeated 5 times to obtain about 150 g of the reaction product as a whole.

A separable flask was charged with 140 g of the thus-obtained 2-(4-t-butylphenoxy)-1,4-dimethoxybenzene, 1000 g of aluminum trichloride and 500 cc of benzene. The mixture was stirred at 100° C. for 2 hours and was thrown into ice-hydrochloric acid. The formed precipitate was recovered by filtration, washed with water and dried to obtain about 100 g of 2-(4-t-butylphenoxy)hydroquinone.

Finally, 90 g of the thus-obtained 2-(4-t-butylphenoxy)hydroquinone was acetylated with 200 g of acetic anhydride and one drop of sulfuric acid and distillation under reduced pressure was carried out to obtain about 100 g of 2-(4-t-butylphenoxy)hydroquinone diacetate, which was used for the subsequent polymerization.

Polymerization

A polymerization reaction vessel equipped with a stirrer and a reduced pressure distilling device was charged with 85.5 g (0.25 mole) of 2-(4-t-butylphenoxy)hydroquinone diacetate, 41.5 g (0.25 mole) of terephthalic acid and 19.8 g (0.11 mole) of p-acetoxybenzoic acid, and in a nitrogen current, the temperature was elevated to 320° C. with stirring over a period of 80 minutes. Reaction was carried out at 320° C. for 10 minutes. Then, the pressure was gradually reduced over a period of 2 minutes and then reaction was conducted under 0.2 Torr for 10 minutes. After completion of the reaction, nitrogen was introduced to restore the normal pressure, and the polyester melt was taken out, rapidly cooled and solidified, and then pulverized by a crusher to form a chip.

The elementary analysis values of the thus-obtained polyester are as follows.

Found value: C=73.5%, H=5.0%. Calculated value: C=73.7%, H=4.9%.

The softening point of this polyester was 320° C. as determined according to the above-mentioned method, and the polyester showed an optical anisotropy in the molten state. Incidentally, at temperatures higher than 400° C., the melt contained an isotropic portion. Furthermore, the melt showed a fiber-forming property. The inherent viscosity was 1.64.

Spinning

The obtained chip was dried at 180° C. under reduced pressure for 8 hours. The chip was extruded at a spinning orifice temperature of 350° C. by using a melt spinning apparatus comprised of an extruder having a screw diameter of 25 mm and a spinneret having 6 orifices each having a diameter of 0.25 mm. The extrudate was wound at a rate of 320 m/min. The obtained polyester fiber was characterized by an X-ray orientation angle of 16.3°, a single filament denier of 12.0, a tensile strength of 2.6 g/d, an elongation of 1.0% and an initial modulus of 323 g/d.

Heat Treatment

The fiber was placed in a cylindrical flask having an inner volume of 10 l, and the temperature was elevated to 290° C. over a period of 25 minutes while supplying nitrogen at a rate of 2 l/min. The heat treatment was carried out at 290° C. for 20 minutes. The obtained heat-treated fiber was characterized by an X-ray orientation angle of 16.5°, an inherent viscosity of 15.6, a tensile strength of 17.3 g/d, an elongation of 4.7% and an initial modulus of 280 g/d. The tensile strength and elongation were remarkably improved by carrying out the heat treatment for a short time.

EXAMPLES 18 THROUGH 22

Polyesters differing in the kinds of the monomers and the monomer composition were prepared in the same manner as described in Example 17. The softening points, inherent viscosities and elementary analysis values of these polyesters are shown in Table 3.

Each of the polyesters had a melt anisotropy, and when the polyester was taken out from the polymerization vessel, it showed a fiber-forming property. Each polyester had a flowability suitable for the spinning, film-forming or other melt shaping operation at a temperature higher by at least 5° C. than the softening point. Each polyester could be formed into a tough film by a hot press machine.

TABLE 3

| Example No. | Amounts charged (moles) | | | | Softening point (°C.) | Inherent viscosity | Elementary analysis value (%) | | | | | | | |
|---|---|---|---|---|---|---|---|---|---|---|---|---|---|---|
| | Substituted phenoxyhydroquinone diacetate | Terephthalic acid | p-Acetoxy-benzoic acid | Methyl-hydroquinone diacetate | | | Found value | | | | Calculated value | | | |
| | | | | | | | C | H | N | Cl | C | H | N | Cl |
| 18 | 2-(4-t-Butyl-phenoxy)hydroquinone diacetate 0.060 | 0.056 | — | — | 370 | 0.78 | 74.4 | 5.1 | 0 | 0 | 74.2 | 5.2 | 0 | 0 |
| 19 | 2-(4-Chloro-phenoxy)hydroquinone diacetate 0.060 | 0.058 | — | — | 380 | 2.65 | 65.2 | 3.0 | 0 | 9.8 | 65.5 | 3.0 | 0 | 9.7 |
| 20 | 2-(4-Chloro-phenoxy)hydroquinone diacetate 0.025 | 0.025 | 0.011 | — | 320 | 1.65 | 65.9 | 3.1 | 0 | 8.8 | 66.1 | 3.0 | 0 | 8.5 |
| 21 | 2-(3-Nitro-phenoxy)hydroquinone diacetate 0.030 | 0.030 | 0.030 | — | 330 | 4.45 | 64.8 | 2.5 | 3.6 | 0 | 65.2 | 2.2 | 3.5 | 0 |
| 22 | 2-(3-Methyl phenoxy)hydroquinone diacetate 0.025 | 0.040 | 0.010 | 0.015 | 270 | 3.10 | 74.9 | 4.0 | 0 | 0 | 74.7 | 4.1 | 0 | 0 |

COMPARATIVE EXAMPLE 1

In this Comparative Example, it is demonstrated that a fiber obtained from a polyester composed of phenylhydroquinone and terephthalic acid residues, which is disclosed in U.S. Pat. No. 4,159,365, is inferior to a fiber obtained from the polyester of the present invention in the rate of increase of the tensile strength by the heat treatment.

A polyester was prepared from 130 g (0.48 mole) of phenylhydroquinone diacetate and 76 g (0.46 mole) of terephthalic acid in the same manner as described in Example 1. This polyester had a softening point of 340° C. and an inherent viscosity of 2.1. The polyester was extruded at a spinning orifice temperature of 350° C. by using the same melt spinning apparatus as used in Example 1 and was wound at a rate of 73 m/min. The obtained polyester fiber was characterized by a single filament denier of 18, a tensile strength of 1.1 g/d, an elongation of 0.4% and an initial modulus of 322 g/d. The polyester fiber was heat-treated at 330° C. for 1 hour, 6 hours or 14 hours by using the same device as used in Example 1. The tensile strength was 5.5 g/d, 16.9 g/d or 18.2 g/d. Thus, it was confirmed that the rate of increase of the tensile strength by the heat treatment was much lower than in the polyester fibers obtained in Examples 1, 6 and 17.

We claim:

1. A polyester having a melt anisotropy, which consists essentially of structural units represented by the following general formulae:

wherein X stands for a hydrogen atom, a chlorine atom, a methyl group, an ethyl group, a propyl group, a butyl group, a methoxy group, an ethoxy group, a nitro group or a cyano group, Ar stands for a divalent group selected from 1,4-phenylene, chloro-1,4-phenylene, methyl-1,4-phenylene, 4,4'-biphenylene, 3,5,3',5'-tetramethyl-4,4'-biphenylene, 1,4-naphthalene, 1,5-naphthalene, 2,6-naphthalene, dimethyl-1,4-phenylene, trimethyl-1,4-phenylene and oxy-4,4'-diphenylene groups, and k, l, m and n represent molar fractions of the corresponding units and they satisfy the following requirements:

$$0 \leq \frac{l}{k+l} \leq 0.5, \quad (1)$$

$$0 \leq \frac{n}{k+l+m+n} \leq 0.7, \quad (2)$$

and $$K+l \approx m \quad (3)$$

2. A polyester as set forth in claim 1, wherein X is a hydrogen atom.

3. A polyester as set forth in claim 2, wherein Ar is a divalent group selected from the group consisting of 1,4-phenylene, chloro-1,4-phenylene, methyl-1,4-phenylene and 4,4'-biphenylene groups.

4. A polyester as set forth in claim 2, wherein molar fraction of the corresponding units satisfy the following requirements:

$$0 \leq \frac{l}{k+l} \leq 0.1$$

$$0.15 \leq \frac{n}{k+l+m+n} \leq 0.25$$

5. A shaped article comprising a wholly aromatic polyester which consists essentially of structural units represented by the following general formulae:

wherein X stands for a hydrogen atom, a chlorine atom, a methyl group, an ethyl group, a propyl group, a butyl group, a methoxy group, an ethoxy group, a nitro group or a cyano group, Ar stands for a divalent group selected from 1,4-phenylene, chloro-1,4-phenylene, methyl-1,14-phenylene, 4,4'-biphenylene, 3,5,3'5'-tetramethyl-4,4'-biphenylene, 1,4-naphthalene, 1,5-naphthalene, 2,6-naphthalene, dimethyl-1,4-phenylene trimethyl-1,4-phenylene and oxy-4,4'-diphenylene groups, and k, l, m and n represent molar fractions of the corresponding units and they satisfy the following requirements:

$$0 \leq \frac{l}{k+l} \leq 0.5, \quad (1)$$

$$0 \leq \frac{n}{k+l+m+n} \leq 0.7, \quad (2)$$

and $$k+l \approx m \quad (3),$$

said wholly aromatic polyester having an inherent viscosity of at least 1.0 as measured at 35° C. using 0.5 gram of polyester per 100 ml of a solvent composed of p-chlorophenol, phenol and tetrachloroethane at a weight ratio of 40/25/35.

6. A shaped article as set forth in claim 5, wherein X is a hydrogen atom.

7. A shaped article as set forth in claim 6, wherein Ar is a divalent group selected from the group consisting of 1,4-phenylene, chloro-1,4-phenylene, methyl-1,4-phenylene and 4,4'-biphenylene groups.

8. A shaped article as set forth in claim 6, wherein molar fraction of the corresponding units satisfy the following requirements:

$$0 \leq \frac{l}{k+l} \leq 0.1$$

$$0.15 \leq \frac{n}{k+l+m+n} \leq 0.25 \qquad (5)$$

9. A shaped article as set forth in claim 5, wherein the shaped article is fiber.

10. A shaped article as set forth in claim 5, wherein the shaped article is film.

11. A process for the preparation of a wholly aromatic polyester shaped article, which comprises the steps of:

melt shaping a polyester consisting essentially of structural units represented by the following general formulae:

[I]

[II]

[III]

[IV]

wherein X stands for a hydrogen atom, a chlorine atom, a methyl group, an ethyl group, a propyl group, a butyl group, a methoxy group, an ethoxy group, a nitro group or a cyano group, Ar stands fro a divalent group selected from 1,4-phenylene, chloro-1,4-phenylene, methyl-1,4-phenylene, 4,4'-biphenylene, 3,5,3',5'-tetramethyl-4,4'-biphenylene, 1,4-naphthalene, 1,5-naphthalene, 2,6-naphthalene, dimethyl-1,4-phenylene, trimethyl-1,4-phenylene and oxy-4,4'-diphenylene groups, and k, l, m and n represent molar fractions of the corresponding units and they satisfy the following requirements:

$$0 \leq \frac{l}{k+l} \leq 0.5, \qquad (1)$$

$$0 \leq \frac{n}{k+l+m+n} \leq 0.7, \qquad (2)$$

and $$k+l \approx m \qquad (3)$$

to form a shaped article, and the heating the shaped article at a temperature in the range of from a temperature lower by 50° C. than the softening point to the softening point.

12. A process as set forth in claim 11, wherein the shaped article is fiber or film.

13. A process as set forth in claim 11, wherein X is a hydrogen atom.

14. A process as set forth in claim 13, wherein Ar is a divalent group selected from the group consisting of 1,4-phenylene, chloro-1,4-phenylene, methyl-1,4-phenylene and 4,4'-biphenylene groups.

15. A process as set forth in claim 13, wherein molar fraction of the corresponding units satisfy the following requirements:

$$0 \leq \frac{l}{k+l} \leq 0.1$$

$$0.15 \leq \frac{n}{k+l+m+n} \leq 0.25$$

16. A process as set forth in claim 11, wherein the polymer constituting the shaped article has an inherent viscosity of not higher than 5.0 before the heat treatment and greater than 7.0 after the heat treatment.

* * * * *